United States Patent
Ishino

(10) Patent No.: US 9,246,919 B2
(45) Date of Patent: Jan. 26, 2016

(54) PORTABLE INFORMATION TERMINAL APPARATUS, METHOD, NON-TRANSITORY COMPUTER READABLE MEDIUM, AND SERVICE UTILIZATION SYSTEM

(71) Applicant: FUJI XEROX CO., LTD., Minato-ku, Tokyo (JP)

(72) Inventor: Shigeki Ishino, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 315 days.

(21) Appl. No.: 14/020,384

(22) Filed: Sep. 6, 2013

(65) Prior Publication Data

US 2014/0289408 A1    Sep. 25, 2014

(30) Foreign Application Priority Data

Mar. 25, 2013    (JP) ................................ 2013-062415

(51) Int. Cl.
*G06F 15/16*    (2006.01)
*H04L 29/06*    (2006.01)

(52) U.S. Cl.
CPC .............. *H04L 63/10* (2013.01); *H04L 63/102* (2013.01); *H04L 63/0492* (2013.01); *H04L 2463/101* (2013.01)

(58) Field of Classification Search
CPC ... H04L 63/10; H04L 63/102; H04L 63/0492; H04L 2463/101
See application file for complete search history.

(56) References Cited

U.S. PATENT DOCUMENTS

| | | | | |
|---|---|---|---|---|
| 6,601,102 B2* | 7/2003 | Eldridge | ........... | G06F 17/30011 707/E17.008 |
| 7,409,452 B2* | 8/2008 | Ragnet | .............. | G06F 17/30011 358/1.15 |
| 7,784,087 B2* | 8/2010 | Yami | .................... | H04L 63/0428 713/185 |
| 8,683,554 B2* | 3/2014 | Martin | .................... | G06F 9/541 717/168 |
| 8,818,412 B2* | 8/2014 | Hotes | .................... | H04L 63/102 455/414.1 |
| 8,860,969 B2* | 10/2014 | Nagasaki | .............. | G06F 3/1211 358/1.1 |
| 8,917,401 B2* | 12/2014 | Saito | .................... | H04N 1/4426 358/1.13 |
| 8,966,596 B2* | 2/2015 | Saito | .................... | G06F 21/608 726/3 |
| 2005/0094195 A1 | 5/2005 | Sakamoto et al. | | |

(Continued)

FOREIGN PATENT DOCUMENTS

| | | | |
|---|---|---|---|
| JP | 2005-141313 A | 6/2005 | |
| JP | 2008-108137 A | 5/2008 | |

(Continued)

OTHER PUBLICATIONS

Communication dated Jul. 7, 2015 from the Japanese Patent Office in counterpart application No. 2013-062415.

*Primary Examiner* — Moustafa M Meky
(74) *Attorney, Agent, or Firm* — Sughrue Mion, PLLC

(57) ABSTRACT

A portable information terminal apparatus includes an obtaining unit that causes an information apparatus shared by multiple users to obtain an access token that contains access right information indicating that the information apparatus has an access right to an external service utilization system, and obtains the obtained access token, and a request unit that transmits the access token obtained by the obtaining unit to the information apparatus upon requesting the external service utilization system to execute a service operation, and causes the information apparatus to perform data communication with the external service utilization system in response to a request for execution of the service operation, using the access token.

6 Claims, 3 Drawing Sheets

(56) References Cited

U.S. PATENT DOCUMENTS

2012/0117629 A1* 5/2012 Miyazawa ............. H04L 63/08
  726/4
2012/0262749 A1 10/2012 Yamamoto

FOREIGN PATENT DOCUMENTS

| JP | 2008-152790 A | 7/2008 |
| JP | 2012-222721 A | 11/2012 |

* cited by examiner

PORTABLE INFORMATION TERMINAL APPARATUS, METHOD, NON-TRANSITORY COMPUTER READABLE MEDIUM, AND SERVICE UTILIZATION SYSTEM

CROSS-REFERENCE TO RELATED APPLICATIONS

This application is based on and claims priority under 35 USC 119 from Japanese Patent Application No. 2013-062415 filed Mar. 25, 2013.

BACKGROUND (i) Technical Field

The present invention relates to a portable information terminal apparatus, a method, a non-transitory computer readable medium, and a service utilization system.

(ii) Related Art

A multifunction apparatus is an information apparatus shared by multiple users, and provides various functions to the users. In recent years, it has become common that such a multifunction apparatus is connected to a network so as to operate in cooperation with other apparatuses and external service utilization systems. Thus, the multifunction apparatus offers more advanced and diverse services to the users.

SUMMARY

According to an aspect of the invention, there is provided a portable information terminal apparatus including: an obtaining unit that causes an information apparatus shared by multiple users to obtain an access token that contains access right information indicating that the information apparatus has an access right to an external service utilization system, and obtains the obtained access token; and a request unit that transmits the access token obtained by the obtaining unit to the information apparatus upon requesting the external service utilization system to execute a service operation, and causes the information apparatus to perform data communication with the external service utilization system in response to a request for execution of the service operation, using the access token.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described in detail with reference to the accompanying drawings.

Figure 1:
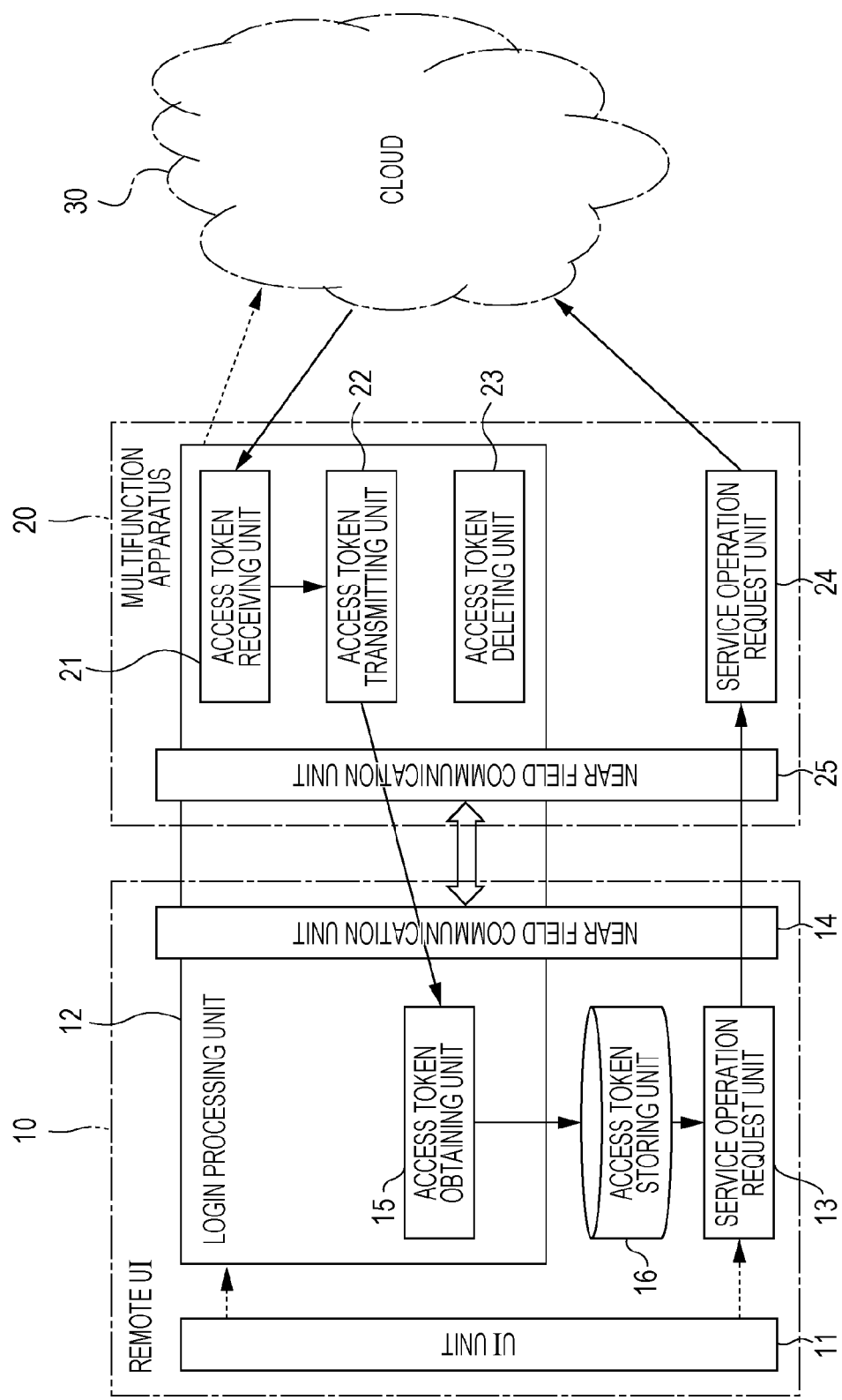
FIG. 1 is a diagram illustrating the overall configuration and block configuration of a service utilization system according to an exemplary embodiment of the present invention.

FIG. 1 is a diagram illustrating the overall configuration and block configuration of a service utilization system according to an exemplary embodiment of the present invention. As shown in FIG. 1, the service utilization system includes a remote user interface (UI) 10, a multifunction apparatus 20, and a cloud 30. In this exemplary embodiment, the remote UI 10 is a portable information terminal apparatus, such as a smartphone or a tablet terminal. The remote UI 10 used in this exemplary embodiment has a near field communication function, and thus may be used as a user interface of the multifunction apparatus 20 when a communication line connection to the multifunction apparatus 20 is established. Accordingly, in this exemplary embodiment, a portable information terminal apparatus is referred to as a remote user interface (UI). The remote UI 10 is personally carried and used by the user of the multifunction apparatus 20, and there may be multiple remote UIs 10. Since the multiple remote UIs 10 have the same configuration, only one remote UI 10 is shown in FIG. 1 for simplicity of illustration.

The multifunction apparatus 20 is an image forming apparatus having copier, scanner, and communication functions and the like, and is an information apparatus shared by multiple users. In this exemplary embodiment, upon using a service provided by the cloud 30, the multifunction apparatus 20 performs data communication with the cloud 30 using an access token. Accordingly, the multifunction apparatus 20 may include at least a communication function.

The cloud 30 is an abbreviation for cloud computing, and provides a specified service in response to a request from various information apparatuses such as the multifunction apparatus 20 over a network. The cloud 30 uses an access token when communicating with each information apparatus. An access token is a data structure describing account identification information and rights of the information apparatus. The cloud 30 issues an access token to an authenticated information apparatus. When the information apparatus transmits the access token upon data communication, the cloud 30 checks the access token against pre-registered security information of each information apparatus, and thereby determines whether to permit access.

Figure 2:
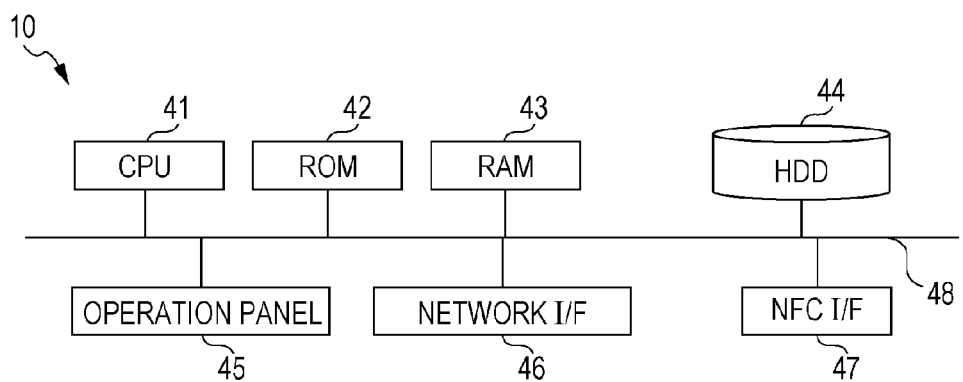
FIG. 2 is a hardware configuration diagram illustrating a computer embedded in a remote user interface according to the exemplary embodiment.

FIG. 2 is a hardware configuration diagram illustrating a computer embedded in the remote UI 10 according to this exemplary embodiment. In this exemplary embodiment, the computer embedded in the remote UI 10 may be realized with an existing general hardware configuration. More specifically, as shown in FIG. 2, the computer includes a CPU 41, a ROM 42, a RAM 43, a hard disk drive (HDD) 44, an operation panel 45 serving as a user interface for displaying and inputting data, a network interface (I/F) 46, and a near field communication interface (NFC I/F) 47 serving as an NFC unit. These components are connected to an internal bus 48.

Figure 3:
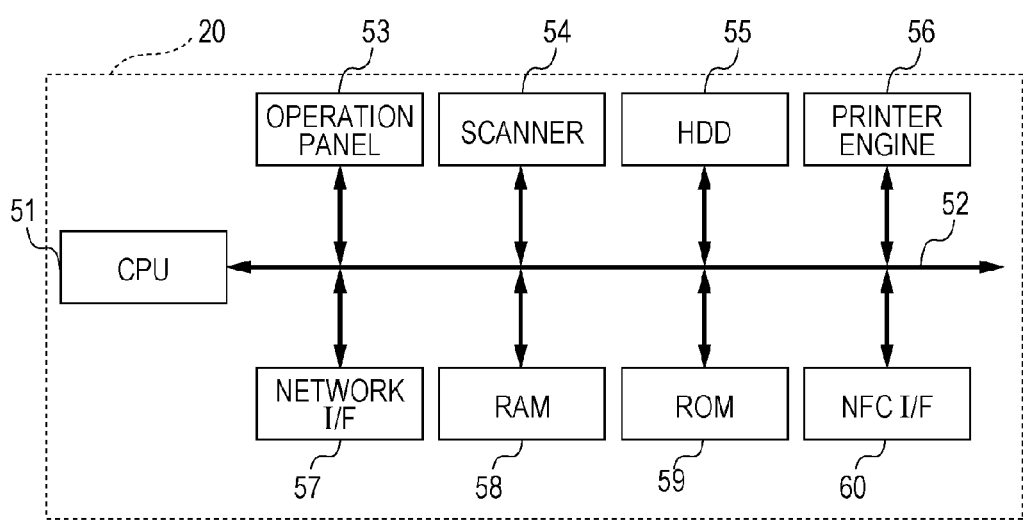
FIG. 3 is a hardware configuration diagram illustrating a multifunction apparatus according to the exemplary embodiment.

FIG. 3 is a hardware configuration diagram illustrating the multifunction apparatus 20 according to the exemplary embodiment. As mentioned above, the multifunction apparatus 20 is an exemplary embodiment of an image forming apparatus having various functions such as copier and scanner functions, and includes an embedded computer. In FIG. 3, a CPU 51 controls operations of various mechanisms, such as a scanner 54 and a printer engine 56, mounted in the multifunction apparatus 20, in accordance with a program stored in a ROM 59. An address data bus 52 is connected to the various mechanisms to be controlled by the CPU 51 for data communication. An operation panel 53 receives an instruction from the user, and displays information. The scanner 54 reads a document placed by the user, and stores the read document as electronic data in an HDD 55 or the like. The HDD 55 stores electronic documents read by the scanner 54 and the like. The printer engine 56 prints a document on output paper in accordance with an instruction from a control program executed by the CPU 51. A network interface (I/F) 57 connects to a network, and is used for transmission of electronic data generated by the multifunction apparatus 20, reception of e-mail transmitted to the multifunction apparatus 20, and data communication with the cloud 30. A RAM 58 serves as a work memory upon execution of a program, and also serves as a communication buffer upon transmission and reception of electronic data. The ROM 59 stores various programs for controlling the multifunction apparatus 20, encrypting electronic data, and transmitting and receiving electronic data. The various programs are executed such that the components (described below) perform predetermined processing functions. A near field communication interface (NFC I/F) 60 performs near field communication with a portable information terminal apparatus having a near field communication interface and the like.

Referring back to FIG. 1, the remote UI 10 includes a user interface (UI) unit 11, a login processing unit 12, a service operation request unit 13, a near field communication unit 14, and an access token storing unit 16. The login process is performed by the remote UI 10 in cooperation with the multifunction apparatus 20. Accordingly, in FIG. 1, the login processing unit 12 is illustrated to extend across both the remote UI 10 and the multifunction apparatus 20. This login processing unit 12 at the remote UI 10 side performs a process of logging in to the cloud 30, in cooperation with the multifunction apparatus 20. An access token obtaining unit 15 included in the login processing unit 12 is provided as an obtaining unit. The access token obtaining unit 15 causes the multifunction apparatus 20 to obtain an access token that contains access right information indicating that the multifunction apparatus 20 has an access right to the cloud 30, and obtains from the multifunction apparatus 20 the access token obtained by the multifunction apparatus 20, and stores the access token in the access token storing unit 16. After obtaining the access token, the access token obtaining unit 15 deletes the access token from the multifunction apparatus 20. The user interface unit 11 displays a menu screen, a login screen, and the like, using the operation panel 45, and receives user inputs from these screens. In particular, the user interface unit 11 of this exemplary embodiment may serve as an interface for the multifunction apparatus 20 upon near field communication. The service operation request unit 13 requests the cloud 30 for a service operation via the multifunction apparatus 20. In particular, the service operation request unit 13 of this exemplary embodiment is provided as a request unit. Upon requesting the cloud 30 to execute a service operation, the service operation request unit 13 transmits the access token obtained by the access token obtaining unit 15 to the multifunction apparatus 20. Thus, the service operation request unit 13 causes the multifunction apparatus 20 to perform data communication with the cloud 30 in response to the request for execution of the service operation, using the access token. The near field communication unit 14 operates in cooperation with the near field communication interface 47 so as to perform near field communication with the multifunction apparatus 20. In particular, the near field communication unit 14 of this exemplary embodiment is provided as a line connection maintaining unit. During a period from establishment of a near field communication line connection to the multifunction apparatus 20 to at least obtaining of the access token, the near field communication unit 14 maintains the near field communication line connected to the multifunction apparatus 20. The access token storing unit 16 stores the access token obtained upon login as described above.

The components 11 through 15 of the remote UI 10 are realized by the cooperative operation of the computer installed in the remote UI 10 and programs executed by the CPU 41 of the computer. The access token storing unit 16 is realized by the HDD 44 installed in the remote UI 10. Alternatively, the access token storing unit 16 may be realized by the RAM 43.

The multifunction apparatus 20 includes an access token receiving unit 21, an access token transmitting unit 22, an access token deleting unit 23, and a service operation request unit 24, which are included in the login processing unit 12. The multifunction apparatus 20 further includes a near field communication unit 25. The access token receiving unit 21 receives an access token transmitted from the cloud 30 upon login. The access token transmitting unit 22 transmits the received access token to the remote UI 10. The access token deleting unit 23 is provided as a deleting unit. The access token deleting unit 23 deletes the access token received and stored in the multifunction apparatus 20, after the access token is transmitted to the remote UI 10. The service operation request unit 24 requests a service operation by transmitting to the cloud 30 a service operation request that is transmitted from the remote UI 10. The near field communication unit 25 operates in cooperation with a near field communication interface 60 so as to perform near field communication with the remote UI 10.

The components 21 through 25 of the multifunction apparatus 20 are realized by the cooperative operation of the computer installed in the multifunction apparatus 20 and programs executed by the CPU 51 of the computer.

Programs used in this exemplary embodiment may be provided by communication units, and may also be provided in the form of computer-readable recording media such as CD-ROM and DVD-ROM. Each program provided by the communication unit or in the form of a recording medium is installed in the computer. The CPU of the computer sequentially executes the program so as to perform various operations.

Figure 4:
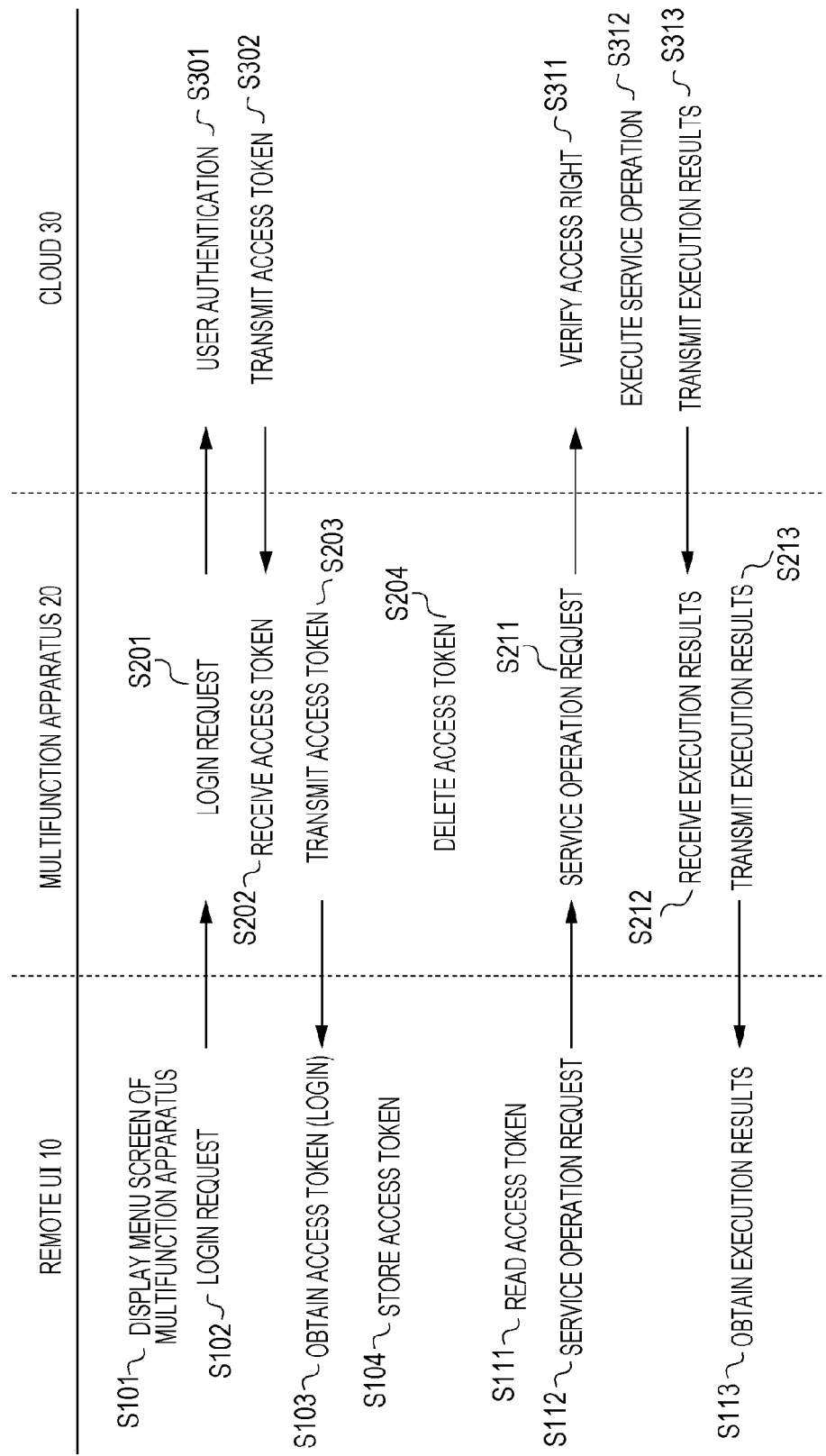
FIG. 4 is a flowchart illustrating a sequence of operations from logging in to a cloud from a remote user interface to obtaining the execution results of a service operation.

Next, a description will be given of operations in this exemplary embodiment. This exemplary embodiment is characterized in that the remote UI 10 obtains from the multifunction apparatus 20 an access token, which is issued by the cloud 30 for data communication with the multifunction apparatus 20, and uses a service provided by the cloud 30 with use of the obtained access token. A sequence of operations from logging in to the cloud 30 from the remote UI 10 to obtaining the execution results of a service operation will be described with reference to the flowchart of FIG. 4.

The user carrying the remote UI 10 approaches the multifunction apparatus 20, and places the near field communication interface 47 close to the near field communication interface 60 of the multifunction apparatus 20 so as to establish a near field communication line connection to the multifunction apparatus 20. When the line connection is established, the user performs a predetermined operation such that a menu screen of the multifunction apparatus 20 is displayed on the operation panel 45 (step S101). In this exemplary embodiment, after the line connection to the multifunction apparatus 20 is established, the remote UI 10 obtains a menu screen from the multifunction apparatus 20 and displays the menu screen on the operation panel 45. However, a dedicated application for displaying a menu screen corresponding to the menu screen of the multifunction apparatus 20 may be installed in the remote UI 10 in advance.

After the line connection to the multifunction apparatus 20 is established, the user of the remote UI 10 performs a predetermined operation on the menu screen displayed on the operation panel 45 so as to start a login process to the cloud 30. Thus, the login processing unit 12 is activated, and receives the user ID and password of the user that are input on the login screen. Then, the login processing unit 12 transmits the user ID and the password to the multifunction apparatus 20 (step S102). The multifunction apparatus 20 transmits a login request containing the user ID and the password to the cloud 30 (step S201).

The cloud 30 performs user authentication on the basis of the transmitted user ID and password (step S301). In this example, it is assumed that authentication is successful. When the authentication is successful, the cloud 30 issues and transmits an access token for data communication with the multifunction apparatus 20 that has requested the login (step S302).

When the access token receiving unit 21 of the multifunction apparatus 20 receives the access token transmitted from the cloud 30 (step S202), the access token transmitting unit 22 transmits the received access token to the remote UI 10 that has requested the login (step S203).

The access token obtaining unit 15 of the remote UI 10 obtains the access token transmitted from the multifunction apparatus 20 (step S103), and stores the access token in the access token storing unit 16 (step S104). Note that when the access token is received, the remote UI 10 recognizes that the login to the cloud 30 is successful.

Further, when the reception of the access token by the remote UI 10 is confirmed, the access token obtaining unit 15 issues an instruction for deleting the access token to the access token deleting unit 23 of the multifunction apparatus 20. In response to this deletion instruction, the access token deleting unit 23 deletes the access token that is temporarily stored in the RAM 58 when the access token is received (step S204). In this exemplary embodiment, the access token obtaining unit 15 instructs the access token deleting unit 23 to delete the access token, after confirming that the access token is stored in the access token storing unit 16 of the remote UI 10. However, the access token deleting unit 23 may independently delete the access token, after confirming that the access token is transmitted to the remote UI 10.

After the access token is loaded into the remote UI 10 in the manner described above, the established near field communication line connection may be disconnected.

In this exemplary embodiment, the access token obtained upon login to the cloud 30 used by the remote UI 10 is present only in the remote UI 10. That is, although the access token is used for data communication between the multifunction apparatus 20 and the cloud 30, the access token obtained by the remote UI 10 is held only in the remote UI 10. Therefore, the access token is not used by other remote UIs 10, or even by the multifunction apparatus 20. In particular, the above-described operation of obtaining the access token is performed by connecting the remote UI 10 to the multifunction apparatus 20 with a near field communication line connection. Accordingly, other remote UIs 10 do not perform near field communication with the multifunction apparatus 20. That is, after the access token is loaded into the remote UI 10, the access token held in the multifunction apparatus 20 may be deleted while the near field communication line connection is established. Thus, it is possible to prevent the access token obtained by the remote UI 10 from being mistakenly or maliciously obtained by another remote UI 10.

The following describes how the remote UI 10 uses a service provided by the cloud 30.

Upon using a service provided by the cloud 30, the user carrying the remote UI 10 approaches to the multifunction apparatus 20 so as to connect a line connection to the multifunction apparatus 20 using a near field communication function. When the line connection is connected, the user performs a predetermined operation so as to activate the service operation request unit 13. The activated service operation request unit 13 reads an access token from the access token storing unit 16 (step S111). Then, the service operation request unit 13 transmits a service operation request with the read access token attached thereto to the multifunction apparatus 20 (step S112).

The service operation request unit 24 of the multifunction apparatus 20 receives the service operation request, and transmits the service operation request to the cloud 30, using the access token transmitted from the remote UI 10 (step S211).

The cloud 30 verifies the access right on the basis of the transmitted access token (step S311). When the cloud 30 determines that the access token received by the cloud 30 is the access token transmitted to the multifunction apparatus 20 in step 5302, the cloud 30 executes the requested service operation (step S312). Then, the cloud 30 transmits the execution results to the multifunction apparatus 20 that has requested the service operation (step S313).

When the access token receiving unit 21 receives the execution results of the service operation transmitted from the cloud 30 (step S212), the service operation request unit 24 of the multifunction apparatus 20 transmits the execution results to the remote UI 10 that has requested the service operation (step S213).

In this way, the service operation request unit 13 of the remote UI 10 obtains the execution results of the requested service operation (step S113). Note that, as in the case of obtaining the access token, after the access token containing the execution results of the service operation is received, the execution results held in the multifunction apparatus 20 may be deleted.

In this exemplary embodiment, the multifunction apparatus 20 is illustrated as an information apparatus shared by multiple users. However, other image forming apparatuses, personal computers having a near field communication function, and the like may be used as the information apparatus.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A portable information terminal apparatus comprising:
an obtaining unit that causes an information apparatus shared by a plurality of users to obtain an access token that contains access right information indicating that the information apparatus has an access right to an external service utilization system, and obtains the obtained access token; and
a request unit that transmits the access token obtained by the obtaining unit to the information apparatus upon requesting the external service utilization system to execute a service operation, and causes the information apparatus to perform data communication with the external service utilization system in response to a request for execution of the service operation, using the access token.

2. The portable information terminal apparatus according to claim 1; further comprising:
a line connection maintaining unit that, during a period from establishment of a near field communication line connection to the information apparatus to at least obtaining of the access token, maintains the near field communication line connection connected to the information apparatus.

3. A method comprising:
causing an information apparatus shared by a plurality of users to obtain an access token that contains access right information indicating that the information apparatus has an access right to an external service utilization system, and obtaining the access token from the information apparatus; and
transmitting to the information apparatus the access token obtained from the information apparatus, upon requesting the external service utilization system to execute a service operation, and causing the information apparatus to perform data communication with the external service utilization system in response to a request for execution of the service operation, using the access token.

4. A non-transitory computer readable medium storing a program causing a computer to execute a process, the process comprising:
causing an information apparatus shared by a plurality of users to obtain an access token that contains access right information indicating that the information apparatus has an access right to an external service utilization system, and obtaining the access token from the information apparatus; and
transmitting to the information apparatus the access token obtained from the information apparatus, upon requesting the external service utilization system to execute a service operation, and causing the information apparatus to perform data communication with the external service utilization system in response to a request for execution of the service operation, using the access token.

5. A service utilization system comprising:
an information apparatus shared by a plurality of users; and
at least one portable information terminal apparatus that communicates with the information apparatus, the at least one portable information terminal apparatus including
an obtaining unit that obtains an access token that contains access right information indicating that the information apparatus has an access right to an external service utilization system, and
a request unit that transmits the access token obtained by the obtaining unit to the information apparatus upon requesting the external service utilization system to execute a service operation, and causes the information apparatus to perform data communication with the external service utilization system in response to a request for execution of the service operation, using the access token.

6. The service utilization system according to claim 5; further comprising:
a deleting unit that deletes the access token held in the information apparatus, after the access token obtained by the obtaining unit is stored in a memory of the at least one portable information terminal apparatus.

\* \* \* \* \*